US011703610B2

(12) United States Patent
Ma (10) Patent No.: US 11,703,610 B2
(45) Date of Patent: *Jul. 18, 2023

(54) ENHANCED INVERSION IMAGING (71) Applicant: Halliburton Energy Services, Inc., Houston, TX (US)

(72) Inventor: Jin Ma, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/900,214

(22) Filed: Aug. 31, 2022

(65) Prior Publication Data

US 2022/0413179 A1    Dec. 29, 2022

Related U.S. Application Data

(63) Continuation of application No. 16/645,465, filed as application No. PCT/US2019/032533 on May 15, 2019, now Pat. No. 11,448,795.

(51) Int. Cl.
  *G01V 3/38* (2006.01)
  *G01V 3/28* (2006.01)
  *E21B 49/00* (2006.01)

(52) U.S. Cl.
  CPC .............. *G01V 3/38* (2013.01); *E21B 49/00* (2013.01); *G01V 3/28* (2013.01)

(58) Field of Classification Search
  CPC ... G01V 3/38; G01V 3/00; G01V 3/28; G01V 3/40; G01V 3/26; G01V 3/18; E21B 49/00
  See application file for complete search history.

(56) References Cited

U.S. PATENT DOCUMENTS

| 6,098,019 A    | * | 8/2000  | Hakvoort   | G01V 3/20 |
|                |   |         |            | 702/7     |
| 9,383,475 B2   | * | 7/2016  | MacGregor  | G01V 11/00|
| 2003/0028324 A1|   | 2/2003  | Xioa et al.|           |
| 2010/0018719 A1| * | 1/2010  | Lu         | G01V 3/12 |
|                |   |         |            | 166/369   |
| 2012/0061092 A1|   | 3/2012  | Willen     |           |
| 2013/0080058 A1| * | 3/2013  | Wu         | G01V 3/30 |
|                |   |         |            | 702/7     |
| 2015/0300150 A1|   | 10/2015 | Burkay     |           |
| 2016/0002977 A1|   | 1/2016  | Wu et al.  |           |
| 2016/0274263 A1|   | 9/2016  | Hou et al. |           |

OTHER PUBLICATIONS

International Search Report and Written Opinion; PCT Application No. PCT/US2019/032533, dated Feb. 10, 2020.

* cited by examiner

*Primary Examiner* — Mohamed Charioui
(74) *Attorney, Agent, or Firm* — Novak Druce Carroll LLP (57) ABSTRACT

Data filtering and processing techniques for generating improved wellbore resistivity maps are contemplated. In some aspects, a process of the disclosed technology includes steps for receiving a plurality of measurement sets, wherein each measurement set includes electromagnetic field data associated with a geologic formation, performing an inversion on each of the plurality of measurement sets to generate a corresponding plurality of formation profiles, and applying a filter to each of the formation profiles to generate a plurality of profile clusters. In some aspects, the process can further include steps for selecting a representative cluster from among the profile clusters for use in generating a wellbore resistivity map. Systems and machine-readable media are also provided.

20 Claims, 7 Drawing Sheets

FIG. 7

ENHANCED INVERSION IMAGING

CROSS-REFERENCE TO RELATED APPLICATIONS

This application is a continuation application which claims benefit to U.S. application Ser. No. 16/645,465 filed Mar. 7, 2020, which claims benefit to national stage entry of PCT/US2019/032533 filed May 15, 2019, said applications are expressly incorporated herein in their entirety.

TECHNICAL FIELD

The present disclosure pertains to formation evaluation and in particular, to the use of data learning and filtering methods to aid high resolution profile generation to facilitate geosteering.

BACKGROUND

In drilling wells for oil and gas exploration, understanding the structure and properties of the associated geological formation provides information to aid such exploration. The collection of information relating to formation properties and conditions downhole is commonly referred to as "logging," and can be performed during the drilling process.

Various measurement tools exist for use in wireline logging and logging while drilling (LWD). One such tool is an electromagnetic (EM) resistivity tool. A typical resistivity tool includes one or more antennas for transmitting electromagnetic signals into the formation and one or more antennas for receiving a formation response. When operated at low frequencies, the resistivity tool may be called an "induction" tool, and at a high-frequencies may be called an electromagnetic wave propagation tool. Though the physical phenomena that dominate the measurement can vary with frequency, the operating principles for the tool are consistent. In some cases, the amplitude and/or phase of the received signals are compared to the amplitude and/or phase of the transmitted signals to measure formation resistivity. In other cases, the amplitude and/or phase of the received signals are compared to each other to measure the formation resistivity.

When plotted as a function of depth or tool position in the borehole, the resistivity tool measurements are termed "logs" or "resistivity logs." Such logs can provide indications of hydrocarbon concentrations and other information useful to drillers and completion engineers. In particular, azimuthally-sensitive logs can provide information useful for steering the drilling assembly e.g., to facilitate geosteering.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Reservoir resistivity maps are frequently used by drillers and completion engineers to facilitate geosteering and enhance production. However, conventional resistivity maps are often generated using data with limited density, and that has been truncated due to transmission losses, resulting in jumping boundaries and artificial features. Such artifacts limit the usability of the maps and make it difficult to execute geosteering decisions accordingly.

Aspects of the disclosed technology address the foregoing limitations of conventional resistivity inversion image generation by providing novel data processing and filtering methods that improve map resolution and boundary continuity. In some aspects, the disclosed processing and filtering method includes performing filtering and clustering on all inverted formation profiles. Clusters of formation profiles can then be compared with measurement data for validation, and selected on the basis (of low error), for use in generating final wellbore resistivity map images.

Figure 1:
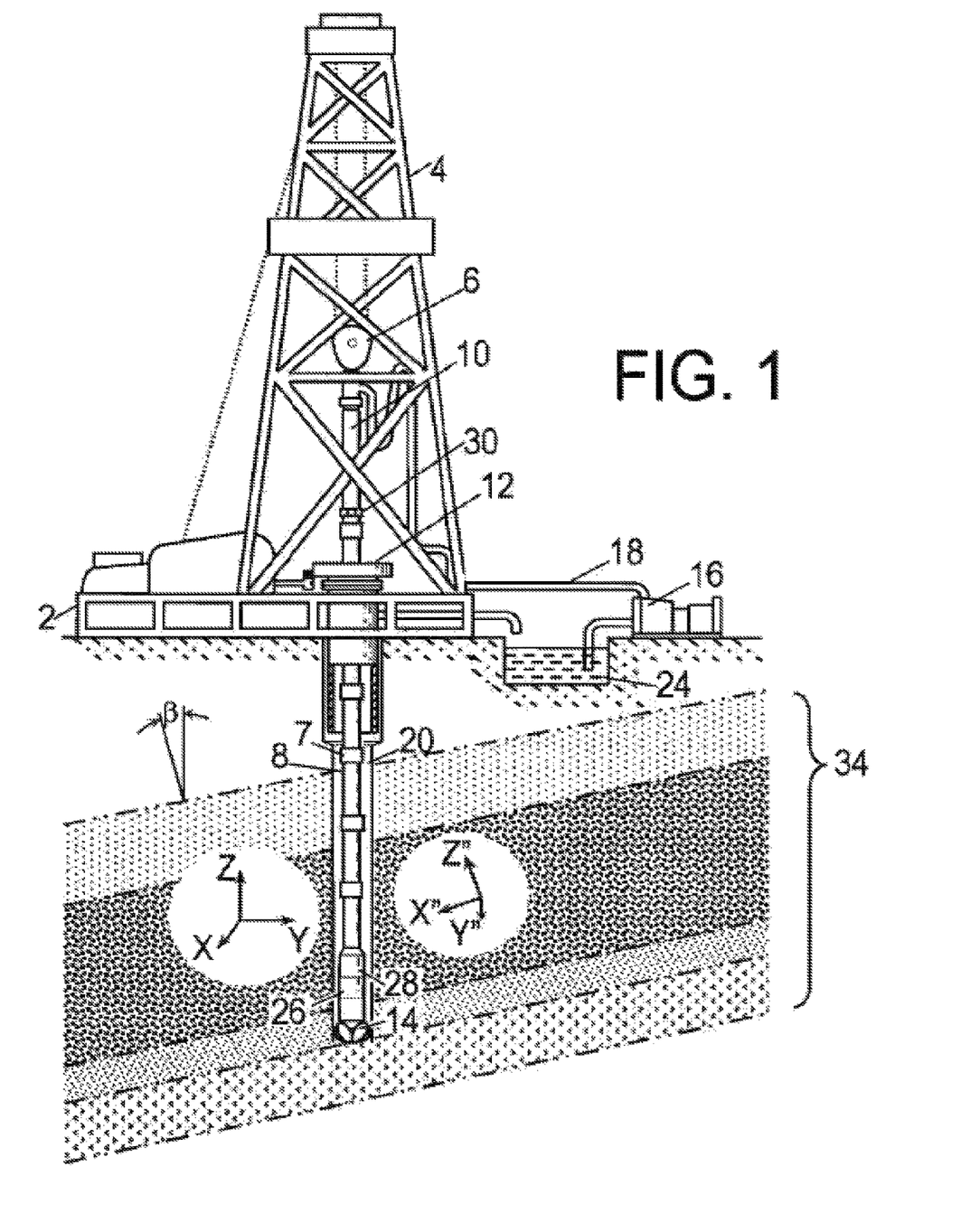
FIG. 1 is a schematic diagram of an example logging-while-drilling (LWD) environment.

To illustrate a context for the disclosed systems and methods, FIG. 1 shows a well during drilling operations. A drilling platform 2 is equipped with a derrick 4 that supports a hoist 6. Drilling oil and gas wells is carried out by a string of drill pipes connected together by "tool" joints 7 so as to form a drill string 8. Hoist 6 suspends a kelly 10 that lowers the drill string 8. Hoist 6 suspends a kelly 10 that lowers the drill string 8 through rotary table 12. Connected to the lower end of the drill string 8 is a drill bit 14. Bit 14 is rotated and drilling accomplished by rotating the drill string 8 by use of a downhole motor near the drill bit, or by both methods.

Drilling fluid, termed "mud," is pumped by mud recirculation equipment 16 through supply pipe 18, through drilling kelly 10, down through the drill string 8 at high pressures and volumes to emerge through nozzles or jets in drill bit 14. The mud then travels back up the hole via the annulus formed between the exterior of drill string 8 and borehole wall 20, through a blowout preventer, and into a mud pit 24 on the surface. On the surface, the drilling mud is cleaned and then recirculated by recirculation equipment 16.

For logging while drilling (LWD), downhole sensors 26 are located in the drillstring 8 near the drill bit 14. Sensors 26 include directional instrumentation and a modular resistivity tool with tilted antennas for detecting bed boundaries. The directional instrumentation measures the inclination angle, the horizontal angle, and the azimuthal angle (also known as the rotational or "tool face" angle) of the LWD tools. As is commonly defined in the art, the inclination angle is the deviation from vertically downward, the horizontal angle is the angle in a horizontal plane from true North, and the tool face angle is the orientation (rotational about the tool axis) angle from the high side of the wellbore.

In some embodiments, directional measurements are made as follows: a three-axis accelerometer measures the earth's gravitational field vector relative to the tool axis and a point on the circumference of the tool called the "tool face scribe line." (The tool face scribe line is drawn on the tool surface is a line parallel to the tool axis.) From this measurement, the inclination and tool face angle of the LWD tool can be determined. Additionally, a three-axis magnetometer measures the earth's magnetic field vector in a similar manner. From the combined magnetometer and accelerometer data, the horizontal angle of the LWD tool can be determined. In addition, a gyroscope or other form of inertial sensor can be incorporated to perform position measurements and further refined orientation measurements.

In some embodiments, downhole sensors 26 are coupled to a telemetry transmitter 28 that transmits telemetry signals by modulating the mud flow in drillstring 8. A telemetry receiver 30 is coupled to kelly 10 to receive transmitted telemetry signals. Other telemetry transmission techniques are well-known and may be used. The receiver 30 communicates the telemetry to a surface insulation (not shown) that processes and stores the measurements.

As illustrated in FIG. 1, drill bit 14 is shown penetrating a formation having a series of layered beds 34 dipping at an angle. A first (x, y, z) coordinate system associated with the sensors 26 is shown, and a second coordinate system (x", y", z") associated with the beds 32 is shown. The bed coordinate system has the z" axis perpendicular to the bedding plane, has the y" axis in a horizontal plane, and has the x" axis pointing "downhill." The angle between the z-axis of the two coordinate systems is referred to as the "dip" and is shown in FIG. 1 as the angle $\beta$.

Figure 2:
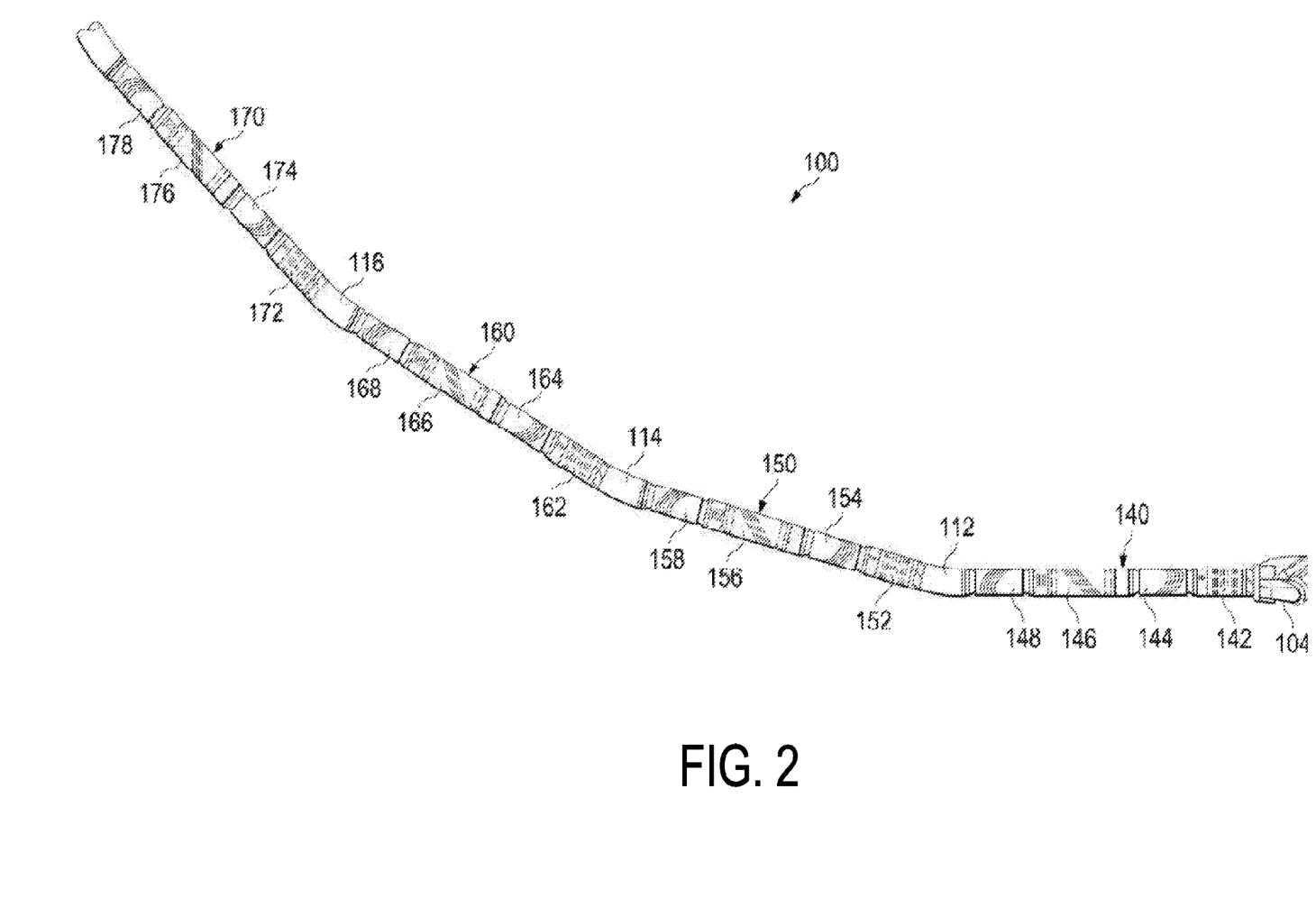
FIG. 2 shows an illustrative resistivity logging tool that can be implemented in accordance with some inventive aspects.

Referring now to FIG. 2, which depicts an example of a multi-sub resistivity tool 100. In the illustrated example, tool 100 comprises a set of four subs distributed along a curved borehole trajectory. The four subs include a first sub 140, a second sub 150, a third sub 160, and a fourth sub 170. A longitudinal axis of the first sub 140 is approximately horizontal with respect to the x-y plane. A drill bit 104 attaches to the lower end (relative to the bottom of the wellbore) to the first sub 140. A first coaxial coil antenna 142 wraps around the body of the first sub 140 near the lower end. The first sub 140 also includes a first tilted coil antenna 144 positioned adjacent to the first coaxial coil antenna 142. The first sub 140 includes a second tilted coil antenna 146 positioned adjacent to the first tilted coil antenna 144. The first sub 140 also includes a third tilted coil antenna 148 adjacent to the second tilted coil antenna 146. In some embodiments, each of the coil antennas 142-148 is operated as transmitter antenna. In other examples, each of the coil antennas 142-148 can be operated as either receiver or transmitter antenna.

A connecting tubular 112 attaches to the upper end (relative to the top of the wellbore) of the first sub 140. A second sub 150 attaches to the upper end of the connecting tubular 112. The second sub 150 is rotatable with respect to its longitudinal axis, and the longitudinal axis can be at an angle with respect to the longitudinal axis of the first sub 140. A first coaxial coil antenna 152 wraps around the lower-most side of the second sub 150. The second sub 150 also includes a first tilted coil antenna 154 positioned above and adjacent to the first coaxial coil antenna 152. The second sub 150 includes a second tilted coil antenna 156 positioned adjacent to the first tilted coil antenna 154. The second sub 150 also includes a third tilted coil antenna 158 adjacent to the second tilted coil antenna 156. In one example, each of the coil antennas 152-158 is operated as receiver antenna. In other examples, each of the coil antennas 152-158 can be operated as either receiver or transmitter antenna.

A connecting tubular 114 attaches to the upper end (relative to the top of the wellbore) of the second sub 150. A third sub 160 attaches to the upper end of the connecting tubular 114. The third sub 160 is rotatable with respect to its longitudinal axis, and the longitudinal axis can be at an angle with respect to the longitudinal axis of the second sub 150. A first coaxial coil antenna 162 wraps around the lower-most side of the third sub 160. The third sub 160 also includes a first tilted coil antenna 164 positioned above and adjacent to the first coaxial coil antenna 162. The third sub 160 includes a second tilted coil antenna 166 positioned adjacent to the first tilted coil antenna 164. The third sub 160 also includes a third tilted coil antenna 168 adjacent to the second tilted coil antenna 166. In one example, each of the coil antennas 162-168 is operated as receiver antenna. In other examples, each of the coil antennas 162-168 can be operated as either receiver or transmitter antenna.

A connecting tubular 116 attaches to the upper end (relative to the top of the wellbore) of the third sub 160. A fourth sub 170 attaches to the upper end of the connecting tubular 114. The fourth sub 170 is rotatable with respect to its longitudinal axis, and the longitudinal axis can be at an angle with respect to the longitudinal axis of the third sub 170. A first coaxial coil antenna 172 wraps around the lower-most side of the fourth sub 170. The fourth sub 170 also includes a first tilted coil antenna 174 positioned above and adjacent to the first coaxial coil antenna 172. The fourth sub 170 includes a second tilted coil antenna 176 positioned adjacent to the first tilted coil antenna 174. The fourth sub 170 also includes a third tilted coil antenna 178 adjacent to the second tilted coil antenna 176. In one example, each of the coil antennas 172-178 is operated as receiver antenna. In other examples, each of the coil antennas 172-178 can be operated as either receiver or transmitter antenna.

Additional details regarding the use of wellbore tools for performing formation resistivity measurements and boundary detection calculations are provided in U.S. Pat. No. 7,659,722, filed Aug. 8, 2007, which is incorporated by reference herein in its entirety.

Figure 3:
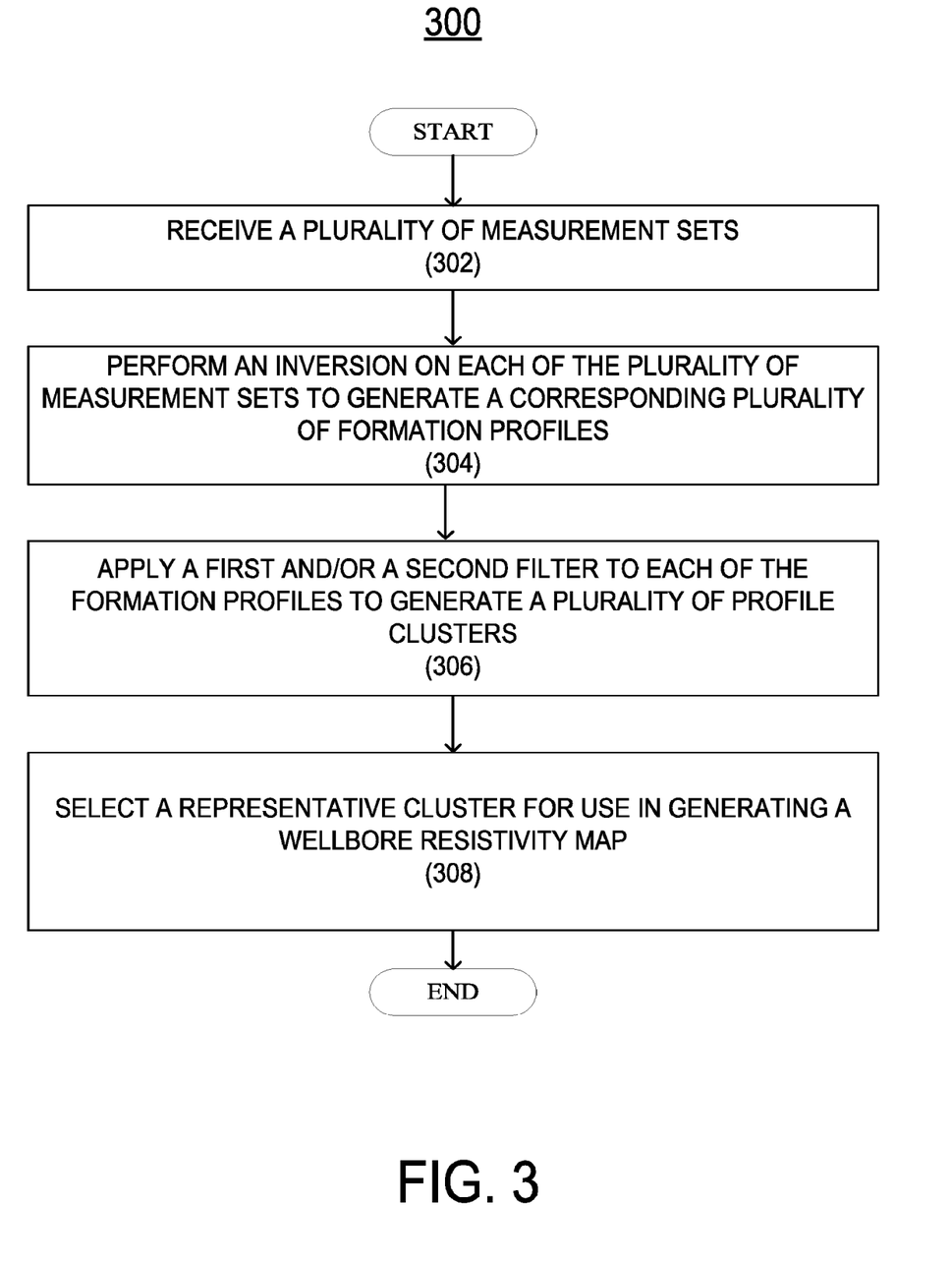
FIG. 3 is a process for performing inversion map processing and filtering.

FIG. 3 illustrates an example process 300 for performing inversion map processing and filtering, according to some aspects of the disclosed technology. Process 300 begins with step 302 in which a plurality of (resistivity) measurement sets are received, for example, from a tool such as tool 102, discussed above with respect to FIG. 2. In some aspects, each of the measurement sets can correspond with measurement data collected at different depths/locations along a wellbore path. Although each measurement set may contain data representing resistivity measurements in any direction relative to the wellbore path, in some aspects each measurement set corresponds with vertical slices of formation resistivity at different true vertical distance (TVD) depths.

In step 304, an inversion is performed on each of the measurement sets to generate a corresponding plurality of inverted formation profiles. Because each measurement set contains data gathered at a different logging point, the corresponding (inverted) formation profiles can represent resistivity boundaries for vertical slices at each logging point.

In step 306, one or more filters are applied to each of the formation profiles to generate a plurality of profile clusters. Profile clusters contain sets of filtered (inverted) formation profiles. In some aspects, each cluster can contain sets of formation profiles that have been filtered with different filter parameters. By way of example, a first cluster may contain a set of formation profiles that have all been filtered using the same filter i.e., a first filter, whereas a second cluster may contain a set of formation profiles that have all been filtered using a different filter, i.e., a second filter.

In some aspects, filtering may be adjusted based on a formation profile basis. For example, a first (filtered) formation profile and a second (filtered) formation profile belonging to a first cluster may have been filtered using different filter parameters. Filter parameter adjustment/selection that is performed for each formation profile, or for each profile cluster, can be based on various types of prior information, such as information for a particular geologic formation or measurement depth. It is understood that any type of information or data can be used to calibrate profile parameters. However, by way of example, filter parameter selection can be based on seismic data and/or offset logs.

Additionally, filtering can be performed using different filtering methods. By way of example, formation profile filtering can be applied in the frequency-domain or in the time domain. For frequency-domain filtering, inverted formation profiles are converted to frequency-domain waveforms (e.g., using a Fourier transform). Frequency domain filtering is then accomplished by multiplying the frequency-domain waveforms by the selected filter. In some aspects, wide-band frequency filters are used, for example, to eliminate high frequency components from the waveforms before they are converted back to time-domain data, e.g., represented by a 2D/3D pixelated space. As discussed above, frequency filter parameters, such as band-width, and center frequency etc., may be selected on a per-formation profile bases, or on a cluster-by-cluster basis, depending on the desired implementation.

For time domain filtering, filter application can be performed directly in the 2D/3D pixel space of the formation profile. In some aspects, statistical information (e.g., a histogram) regarding a given formation profile can be used to selectively eliminate pixel/boundary indications that have a low statistical likelihood of representing ground-truth formation geometries. It is understood that other information, such as formation parameters, may be used to tune time-domain filtering parameters. By way of example, formation parameters can include but are not limited to: formation resistivity, formation dip, formation anisotropy, and/or bed boundary positions, etc.

Once the inverted formation profiles have been filtered into an adequate number of profile clusters, then a process of down-selection can begin (step 308), and a specific profile cluster is selected for use in generating a wellbore resistivity map. In some aspects, cluster down-selection is performed by comparing one or more of the profile clusters to the original measurement set (input) data to determine which profile cluster most accurately represents the measurement data. In this manner, the data filtering process improves output map continuity, while also ensuring that the selected profile cluster is true to the original EM measurement data, received in step 302, discussed above.

In some aspects, down-selection is performed by computing a profile cluster error for each profile cluster, wherein the cluster error corresponds with an amount/degree of deviation of the cluster (i.e., the formation profiles in the cluster) from the original measurement set data. Final cluster selection can then be performed by choosing the profile cluster with the lowest associated error.

In some aspects, one or more subsequent down-selection processing steps can be performed. By way of example, formation profiles in each profile cluster may be mixed into additional and/or different profile clusters. That is, individual (filtered) formation profiles can be mixed into different clusters/sets to determine which cluster contain the lowest error when compared to the input measurement set data. In effect, additional mixing/processing increases the potential solution space for final profile cluster selection.

Figure 4:
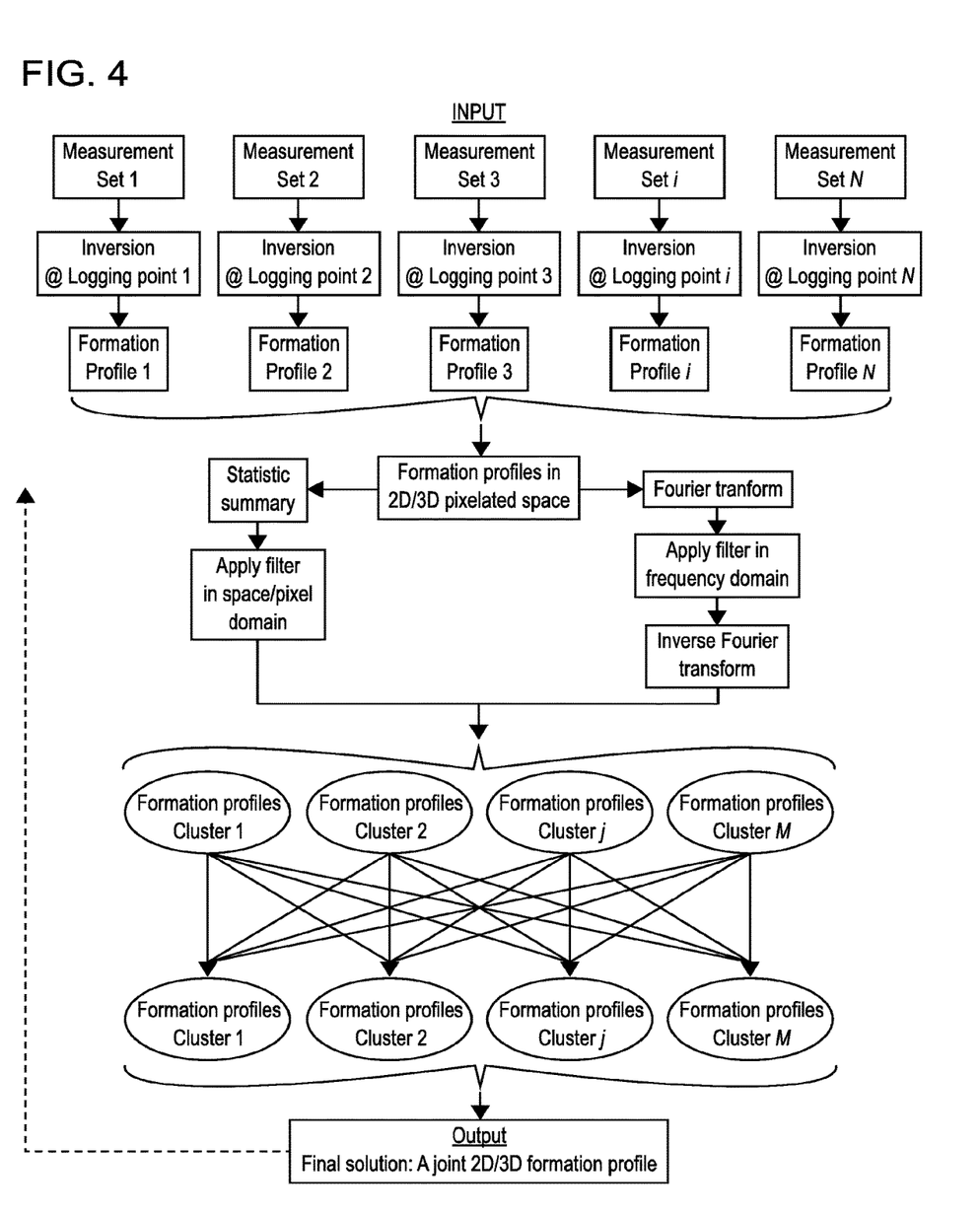
FIG. 4 schematically illustrates a processing pipeline for generating an improved formation resistivity map, in accordance with some aspects of the disclosed technology.

FIG. 4 schematically illustrates a processing pipeline 400 that can be implemented for generating an improved formation resistivity map, according to some aspects of the disclosed technology. As illustrated, pipeline 400 contains input layer 402 that includes one or more measurement data sets, i.e., Measurement Set 1 . . . N. Although any number of measurement sets are contemplated, the size of the input layer is typically consistent with the number of logging points in which measurement set data is collected.

Measurement set data in input layer 402 is subject to inversion processing in layer 404. As discussed above, inversion processing performed on each measurement set converts the EM measurement data, of each set, into an (inverted) formation profile. That is, the output of processing performed at inversion layer 404 is provided to layer 406, which contains plurality of formation profiles, i.e., Formation Profile 1 . . . N. As indicated in block 408, each formation profile in layer 406 can be represented by a 2D/3D pixelated space. As discussed above, in some approaches, each formation profile represents 2D/3D formation boundary data for a vertical slice of a wellbore environment. However, other slice orientations are contemplated, without departing from the scope of the disclosed technology.

Next, individual formation profiles are filtered using either a time-domain filter (e.g., as applied in processing sequence 410), or a frequency-domain filter (e.g., as applied in processing sequence 412). As discussed above, time-domain processing 410 can include steps for generating a statistical summary (e.g., for each formation profile), and applying the filter directly in the space/pixel domain.

For frequency-domain filtering applied in processing sequence 412, each of the (inverted) formation profiles are converted to frequency-domain waveforms, e.g., using a Fourier transform. Frequency filtering is then accomplished by applying the desired frequency filter. As discussed above, wide-band frequency filters can be used, such as Gaussian filters, for example, to eliminate high frequency components. However, other filter types are contemplated, without departing from the scope of the invention. After filtering, the waveforms are converted back to time-domain data, e.g., represented by a 2D/3D pixelated space.

As discussed above, filter selection can be performed on a formation profile-by-profile basis. For example, a first (filtered) formation profile and a second (filtered) formation profile belonging to a first cluster may have been filtered using different parameters. Filter parameter selection can be based on various types of information, such as information for a particular geologic formation, or measurement depth. It is understood that any type of information or data can be used to calibrate profile parameters. However, by way of example, filter parameter selection can be based on seismic data and/or offset logs.

Once the inverted profiles have been filtered, they are sorted into an array of profile clusters for further processing/down-selection at layers 416 and 418. Although pipeline 400 illustrates two processing layers (416, 418) for the formation profiles, it is understood that a greater (or fewer) number of processing layers may be implemented, without departing from the scope of the disclosed technology.

Cluster down-selection performed at layers 416 and/or 418 can be accomplished comparing one or more of the profile clusters to the original measurement set input data (in layer 402) to determine which profile cluster is the most accurate. As discussed above, down-selection can be performed by computing a profile cluster error for each profile cluster, wherein the cluster error corresponds with an amount/degree of deviation from the original measurement data. Final cluster selection can then be performed by choosing the profile cluster with the lowest associated error, which is provided as output in processing block 420. The output solution of processing block 420, therefore, represents a collection of (filtered) formation profiles that most accurately represent the original measurement data received at input layer 402.

In some aspects, final output solutions at block 420 can be compared with prior geologic data, such as seismic data and/or offset logs, and/or other LWD measurements such as gamma ray images and/or density images, in order to update/tune filter parameters, e.g., using feedback 422. In this manner, machine-learning can be deployed to improve filtering on the basis of various wellbore parameters, such as formation location and/or other properties.

Figure 5A:
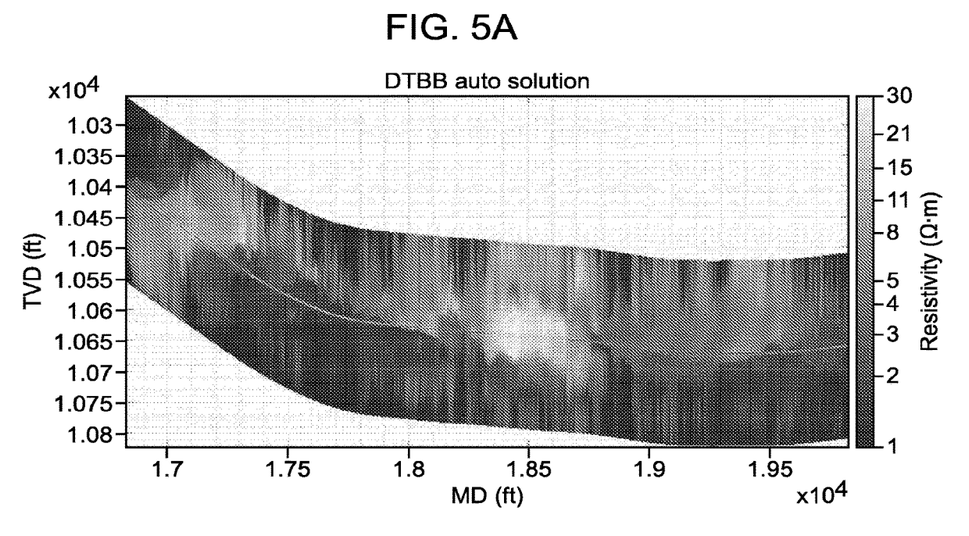
FIG. 5A illustrates an example formation resistivity map that is generated without the use of the disclosed filtering/processing techniques.

FIG. 5A illustrates an example formation resistivity map generated without the data filtering/processing of the disclosed technology. Notably, the map of FIG. 5A is marked by many high-frequency spikes and discontinuities.

Figure 5B:
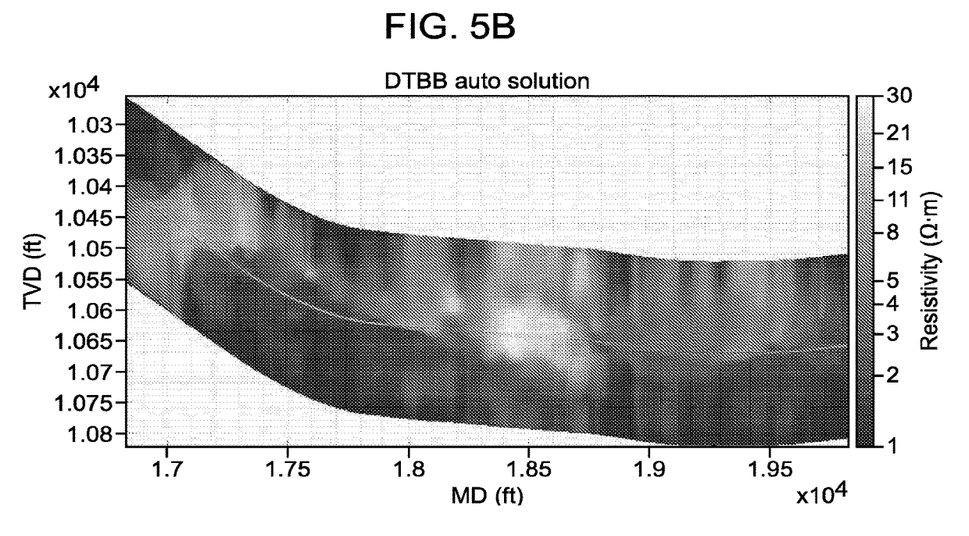
FIG. 5B illustrates an example of an improved formation resistivity map that is generated using the disclosed filtering/processing techniques.

FIG. 5B illustrates an example formation resistivity map that is based on the same data as that of FIG. 5A, but that has been generated using a filtering/processing method of the disclosed technology. Notably, many of the high-frequency spikes seen in FIG. 5A are eliminated, resulting in a more continuous and readable formation map.

Figure 6A:
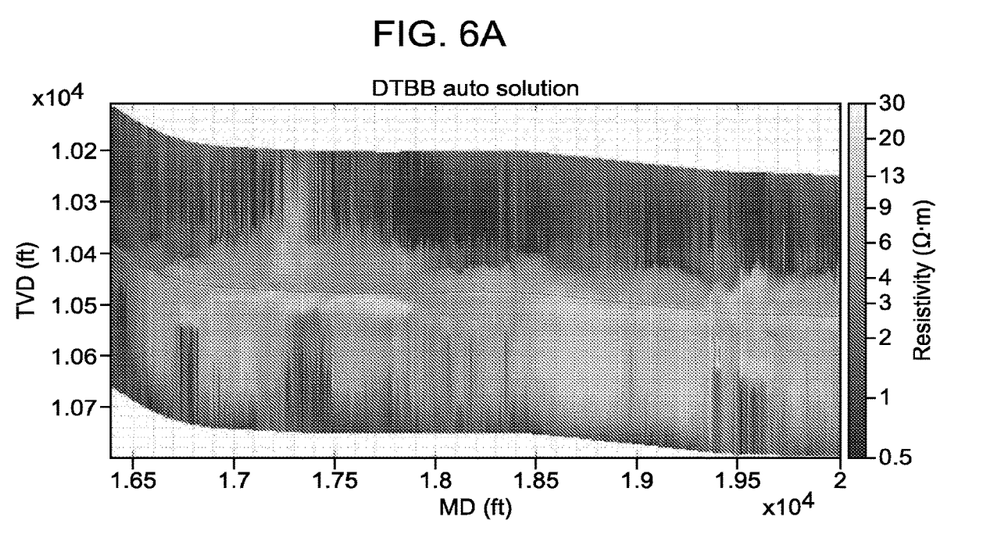
FIG. 6A illustrates an example formation resistivity map that is generated without the use of the disclosed filtering/processing techniques.

FIG. 6A illustrates an example formation resistivity map generated without the data filtering/processing of the disclosed technology. Similar to the map of FIG. 5A, the formation map of FIG. 6A is marked by many high-frequency spikes and discontinuities.

Figure 6B:
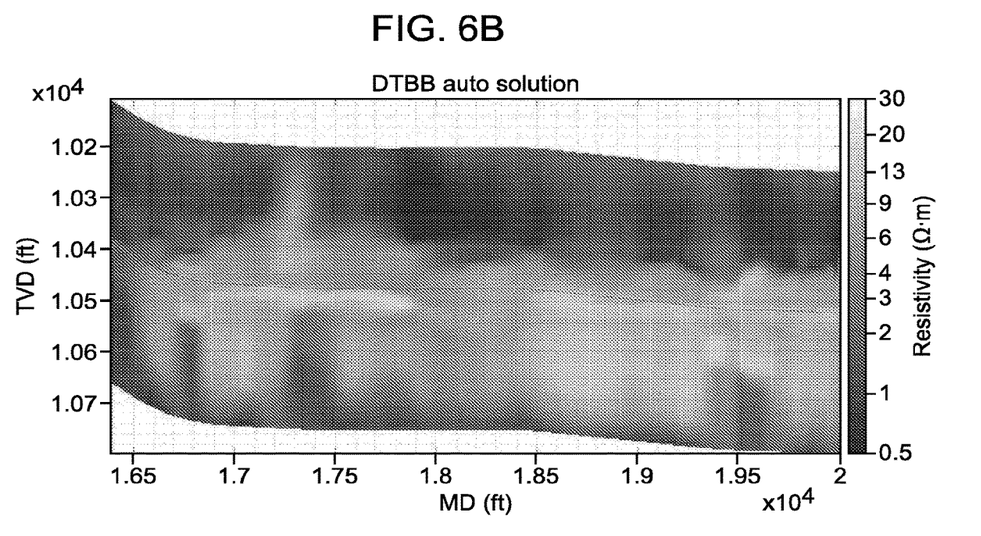
FIG. 6B illustrates an example of an improved formation resistivity map that is generated using the disclosed filtering/processing techniques.

FIG. 6B illustrates an example formation resistivity map that is based on the same data as that of FIG. 6A, but that has been generated using a filtering/processing method of the disclosed technology.

Figure 7:
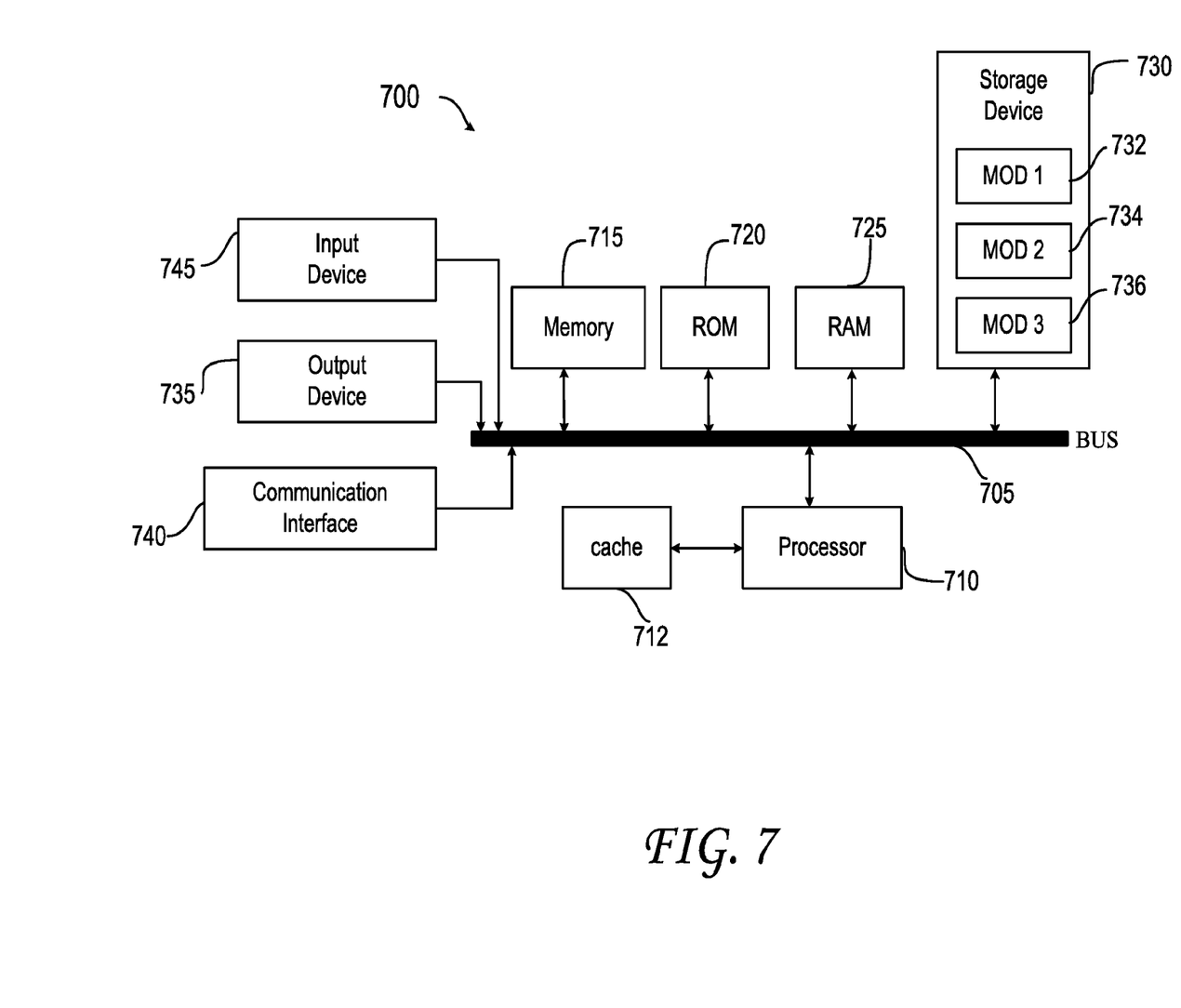
FIG. 7 is a schematic diagram of an example system embodiment.

FIG. 7 illustrates an exemplary computing system for use with example tools and systems (e.g., tool 102). The more appropriate embodiment will be apparent to those of ordinary skill in the art when practicing the present technology. Persons of ordinary skill in the art will also readily appreciate that other system embodiments are possible.

Specifically, FIG. 7 illustrates system architecture 700 wherein the components of the system are in electrical communication with each other using a bus 705. System architecture 700 can include a processing unit (CPU or processor) 710, as well as a cache 712, that are variously coupled to system bus 705. Bus 705 couples various system components including system memory 715, (e.g., read only memory (ROM) 720 and random access memory (RAM) 735), to processor 710. System architecture 700 can include a cache of high-speed memory connected directly with, in close proximity to, or integrated as part of the processor 710. System architecture 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. Memory 715 can include multiple different types of memory with different performance characteristics. Processor 710 can include any general-purpose processor and a hardware module or software module, such as module 1 (732), module 2 (734), and module 3 (736) stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction with the computing system architecture 700, input device 745 can represent any number of input mechanisms, such as a microphone for speech, a touch-sensitive screen for gesture or graphical input, keyboard, mouse, motion input, and so forth. An output device 742 can also be one or more of a number of output mechanisms. In some instances, multimodal systems can enable a user to provide multiple types of input to communicate with the computing system architecture 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 735, read only memory (ROM) 720, and hybrids thereof.

Storage device 730 can include software modules 732, 734, 736 for controlling the processor 710. Other hardware or software modules are contemplated. The storage device 730 can be connected to the system bus 705. In one aspect, a hardware module that performs a particular function can include the software component stored in a computer-readable medium in connection with the necessary hardware components, such as the processor 710, bus 705, output device 742, and so forth, to carry out various functions of the disclosed technology.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

STATEMENTS OF THE DISCLOSURE

Statement 1: a method for generating a wellbore resistivity map, comprising: receiving a plurality of measurement sets, wherein each measurement set comprises electromagnetic field data associated with a geologic formation; performing an inversion on each of the plurality of measurement sets to generate a corresponding plurality of formation profiles; applying a first filter to each of the formation profiles to generate a first profile cluster; applying a second filter to each of the formation profiles to generate a second profile cluster; selecting a representative cluster from among the first profile cluster and the second profile cluster for use in generating a wellbore resistivity map.

Statement 2: the system of statement 1, wherein selecting the representative cluster further comprises: comparing the first profile cluster to the plurality of measurement sets to determine a first profile cluster error; comparing the second profile cluster to the plurality of measurement sets to determine a second profile cluster error; and selecting the representative cluster based on the first profile cluster error and the second profile cluster error.

Statement 3: the method of any of statements 1-2, wherein the electromagnetic field data for each measurement set is associated with different depths in the geologic formation.

Statement 4: the method of any of statements 1-3, wherein the first filter is selected based on one or more properties of the geologic formation.

Statement 5: the method of any of statements 1-4, wherein applying the first filter to each of the formation profiles further comprises adjusting the first filter based on a collection depth corresponding with each of the formation profiles.

Statement 6: the method of any of statements 1-5, wherein the first filter comprises one or more filter parameters that are selected based on seismic data or offset logs.

Statement 7: the method of any of statements 1-6, wherein applying the first filter to each of the formation profiles to generate the first profile cluster further comprises: converting each of the formation profiles into a frequency-domain to produce a corresponding plurality of frequency profiles; and applying a frequency filter to each of the frequency profiles.

Statement 8: a system for generating a wellbore resistivity map, the system comprising: one or more processors; and a non-transitory memory coupled to the one or more processors, wherein the memory comprises instruction configured to cause the processors to perform operations for: receiving a plurality of measurement sets, wherein each measurement set comprises electromagnetic field data associated with a geologic formation; performing an inversion on each of the plurality of measurement sets to generate a corresponding plurality of formation profiles; applying a first filter to each of the formation profiles to generate a first profile cluster; applying a second filter to each of the formation profiles to generate a second profile cluster; selecting a representative cluster from among the first profile cluster and the second profile cluster for use in generating a wellbore resistivity map.

Statement 9: the system of statement 8, wherein selecting the representative cluster further comprises: comparing the first profile cluster to the plurality of measurement sets to determine a first profile cluster error; comparing the second profile cluster to the plurality of measurement sets to determine a second profile cluster error; and selecting the representative cluster based on the first profile cluster error and the second profile cluster error.

Statement 10: the system of any of statements 8-9, wherein the electromagnetic field data for each measurement set is associated with different depths in the geologic formation.

Statement 11: the system of any of statements 9-10, wherein the first filter is selected based on one or more properties of the geologic formation.

Statement 12: the system of any of statements 9-11, wherein applying the first filter to each of the formation profiles further comprises adjusting the first filter based on a collection depth corresponding with each of the formation profiles.

Statement 13: the system of any of statements 9-12, wherein the first filter comprises one or more filter parameters that are selected based on seismic data or offset logs.

Statement 14: the system of any of statements 9-13, wherein applying the first filter to each of the formation profiles to generate the first profile cluster further comprises: converting each of the formation profiles into a frequency-domain to produce a corresponding plurality of frequency profiles; and applying a frequency filter to each of the frequency profiles.

Statement 15: a tangible, non-transitory, computer-readable media having instructions encoded thereon, the instructions, when executed by a processor, are operable to perform operations for: receiving a plurality of measurement sets, wherein each measurement set comprises electromagnetic field data associated with a geologic formation; performing an inversion on each of the plurality of measurement sets to generate a corresponding plurality of formation profiles; applying a first filter to each of the formation profiles to generate a first profile cluster; applying a second filter to each of the formation profiles to generate a second profile cluster; selecting a representative cluster from among the first profile cluster and the second profile cluster for use in generating a wellbore resistivity map.

Statement 16: the tangible, non-transitory, computer-readable media of statement 15, wherein selecting the representative cluster further comprises: comparing the first profile cluster to the plurality of measurement sets to determine a first profile cluster error; comparing the second profile cluster to the plurality of measurement sets to determine a second profile cluster error; and selecting the representative cluster based on the first profile cluster error and the second profile cluster error.

Statement 17: the tangible, non-transitory, computer-readable media of any of statements 15-16, wherein the electromagnetic field data for each measurement set is associated with different depths in the geologic formation.

Statement 18: the tangible, non-transitory, computer-readable media of any of statements 15-17, wherein the first filter is selected based on one or more properties of the geologic formation.

Statement 19: the tangible, non-transitory, computer-readable media of any of statements 15-18, wherein applying the first filter to each of the formation profiles further comprises adjusting the first filter based on a collection depth corresponding with each of the formation profiles.

Statement 20: the tangible, non-transitory, computer-readable media of any of statements 15-19, wherein the first filter comprises one or more filter parameters that are selected based on seismic data or offset logs.

What is claimed is:

1. A method for generating a wellbore resistivity map, comprising:
   receiving a plurality of measurement sets, wherein each measurement set comprises electromagnetic field data associated with a geologic formation;
   performing an inversion on each of the plurality of measurement sets to generate a corresponding plurality of formation profiles;
   applying at least one filter to each of the formation profiles to generate at least one profile cluster;
   selecting a representative cluster from the generated profile clusters; and
   generating a wellbore resistivity map to either or both facilitate geosteering and enhance production in association with the geologic formation, wherein the wellbore resistivity map is generated from the representative cluster that is selected from the generated profile clusters.

2. The method of claim 1, wherein the electromagnetic field data for each measurement set is associated with different depths in the geologic formation.

3. The method of claim 1, wherein the at least one filter is selected based on one or more properties of the geologic formation.

4. The method of claim 1, wherein applying the at least one filter to each of the formation profiles further comprises adjusting the at least one filter based on a collection depth corresponding with each of the formation profiles.

5. The method of claim 1, wherein the at least one filter comprises one or more filter parameters that are selected based on seismic data or offset logs.

6. The method of claim 1, wherein applying the at least one filter to each of the formation profiles to generate the at least one profile cluster further comprises:
   converting each of the formation profiles into a frequency-domain to produce a corresponding plurality of frequency profiles; and
   applying a frequency filter to each of the frequency profiles.

7. The method of claim 1, wherein selecting the representative cluster further comprises:
   comparing the at least one profile cluster to the plurality of measurement sets to determine a profile cluster error;
   selecting the representative cluster based on the profile cluster error.

8. A system for generating a wellbore resistivity map, the system comprising:
   one or more processors; and
   a non-transitory memory coupled to the one or more processors, wherein the memory comprises instruction configured to cause the processors to perform operations for:
   receiving a plurality of measurement sets, wherein each measurement set comprises electromagnetic field data associated with a geologic formation;
   performing an inversion on each of the plurality of measurement sets to generate a corresponding plurality of formation profiles;
   applying at least one filter to each of the formation profiles to generate at least one profile cluster;
   selecting a representative cluster from the generated profile clusters; and
   generating a wellbore resistivity map to either or both facilitate geosteering and enhance production in association with the geologic formation, wherein the wellbore resistivity map is generated from the representative cluster that is selected from the generated profile clusters.

9. The system of claim 8, wherein the electromagnetic field data for each measurement set is associated with different depths in the geologic formation.

10. The system of claim 8, wherein the at least one filter is selected based on one or more properties of the geologic formation.

11. The system of claim 8, wherein applying the at least one one filter to each of the formation profiles further comprises adjusting the at least one filter based on a collection depth corresponding with each of the formation profiles.

12. The system of claim 8, wherein the at least one filter comprises one or more filter parameters that are selected based on seismic data or offset logs.

13. The system of claim 8, wherein applying the at least one filter to each of the formation profiles to generate the at least one profile cluster further comprises:
converting each of the formation profiles into a frequency-domain to produce a corresponding plurality of frequency profiles; and
applying a frequency filter to each of the frequency profiles.

14. The system of claim 8, wherein selecting the representative cluster further comprises:
comparing the at least one profile cluster to the plurality of measurement sets to determine a profile cluster error;
selecting the representative cluster based on the profile cluster error.

15. A tangible, non-transitory, computer-readable media having instructions encoded thereon, the instructions, when executed by a processor, are operable to perform operations for:
receiving a plurality of measurement sets, wherein each measurement set comprises electromagnetic field data associated with a geologic formation;
performing an inversion on each of the plurality of measurement sets to generate a corresponding plurality of formation profiles;
applying at least one filter to each of the formation profiles to generate at least one profile cluster;
selecting a representative cluster from the generated profile clusters; and
generating a wellbore resistivity map to either or both facilitate geosteering and enhance production in association with the geologic formation, wherein the wellbore resistivity map is generated from the representative cluster that is selected from the generated profile clusters.

16. The tangible, non-transitory, computer-readable media of claim 15, wherein the electromagnetic field data for each measurement set is associated with different depths in the geologic formation.

17. The tangible, non-transitory, computer-readable media of claim 15, wherein the at least one filter is selected based on one or more properties of the geologic formation.

18. The tangible, non-transitory, computer-readable media of claim 15, wherein applying the at least one filter to each of the formation profiles further comprises adjusting the at least one filter based on a collection depth corresponding with each of the formation profiles.

19. The tangible, non-transitory, computer-readable media of claim 15, wherein the at least one filter comprises one or more filter parameters that are selected based on seismic data or offset logs.

20. The tangible, non-transitory, computer-readable media of claim 15, wherein selecting the representative cluster further comprises:
comparing the at least one profile cluster to the plurality of measurement sets to determine a profile cluster error;
selecting the representative cluster based on the profile cluster error.

* * * * *